United States Patent Office 3,644,582
Patented Feb. 22, 1972

3,644,582
GRAFT POLYMERIZATION WITH A PERESTER INITIATOR AND A PROMOTER
Donald F. Knaack, Talleybrook, Del., assignor to Avisun Corporation, Philadelphia, Pa.
No Drawing. Filed Apr. 14, 1969, Ser. No. 816,016
Int. Cl. C08f 15/00
U.S. Cl. 260—878 R          10 Claims

ABSTRACT OF THE DISCLOSURE

A dye-receptive copolymer is prepared by the graft polymerization of at least one ethylenically unsaturated monomer onto a polyolefin in the presence of a perester free radical initiator and a promoter. Suitable promoters are inorganic reducing agents such as a lower valent salt of a multivalent metal, a hydrosulfite, a sulfite, a bisulfite, and a thiosulfate or organic reducing agents such as a formaldehyde sulfoxylate, hydrazine hydrate and hydrazine salts.

BACKGROUND OF THE INVENTION

This invention relates to a method for preparing graft polymerized polyolefins having improved dye receptivity and particularly to polyolefins containing substantially crystalline propylene polymers.

It is well known that hydrocarbon polymers of the non-aromatic type are very difficult to dye. Ample evidence is available in the published technical literature that illustrates the fact that unmodified polyolefins exhibit little or no receptivity for dyestuffs when conventional procedures are employed. Several approaches have been proposed to solve the problem of poor dye characteristics of polyolefins. One method involves the preparation of graft copolymers wherein a dyeable polymer such as vinyl pyridine is grafted onto a polyolefin backbone. This technique is described in U.S. Pat. Nos. 3,049,508 and 3,073,667. Another approach is to prepare a blend of a polyolefin and a polymer that is more dyeable than a polyolefin such as a vinyl pyridine homopolymer and this method is described in U.S. Patent No. 3,315,014.

An improved polyolefin composition has now been obtained by polymerizing an ethylenically unsaturated, heterocyclic nitrogen-containing monomer alone or together with one or more ethylenically unsaturated monomers by graft polymerization onto a polyolefin backbone using a perester free radical initiator together with a promoter for the graft polymerization. The combination of a perester free radical initiator together with a promoter for the graft polymerization provides dye receptive polyolefin compositions that exhibit excellent textile properties. The dye receptive polymer composition may be formed into various shaped articles such as fibers, filaments, yarns, threads, ribbons and the like. Dye receptive polyolefin compositions prepared by graft polymerization in the presence of a perester free radical initiator are described in U.S. patent application Ser. Nos. 781,573 and 781,595, both filed Dec. 5, 1968.

SUMMARY OF THE INVENTION

It is an object of this invention to provide a method for efficiently graft polymerizing at least one ethylenically unsaturated monomer onto a polyolefin backbone using a perester free radical graft polymerization initiator and a promoter. It is another object of this invention to provide polyolefin compositions having improved dye affinity that are prepared by the graft polymerization of at least one monoethylenically unsaturated, heterocyclic nitrogen-containing monomer onto a polyolefin backbone. It is another object of this invention to provide a graft polymerization process wherein high conversions of monomer to polymer, and particularly of monomer to graft copoylmer, are obtained. Still another object of this invention is to obtain a dyeable fiber-forming polyolefin graft copolymer having minimum discoloration and that is capable of being shaped into articles exhibiting excellent fiber properties.

These and other objects of the invention are accomplished by grafting at least one ethylenically unsaturated monomer onto a polyolefin backbone polymer in the presence of a perester free radical initiator and a promoter, preferably wherein at least one monomer is a monoethylenically unsaturated, heterocyclic nitrogen-containing monomer. The perester free radical initiator may be a monoperesetr or a diperester Suitable diperesters include those described in U.S. Patent No. 3,264,274 and preferred diperesters are 2,5-dimethyl-2,5-bis(perneopentanoyl) hexane and 2,5-dimethyl-2,5-bis(2-ethyl perhexanoyl) hexane. Suitable monoperesters include t-butyl 2 - ethyl perhexanoate, t-amyl 2 - ethyl perhexanoate, t-butyl 3,5,5-trimethyl perhexanoate, t-amyl 3,5,5-trimethyl perhexanoate, t-butyl 2-ethyl perbutyrate, t-amyl 2-ethyl perbutyrate, t-butyl perisobutyrate, t-amyl perisobutyrate. Preferred monoperesters are t-butyl 2-ethyl perhexanoate and t-butyl perisobutyrate.

The promoter for the free radical initiator may be an inorganic reducing agent such as a lower valent salt of a multivalent metal, a hydrosulfite, a sulfite, a bisulfite, a thiosulfate or a suitable organic reducing agent such as a formaldehyde sulfoxylate, hydrazine hydrate or a hydrazine salt.

Preferred promoters include substantially colorless reducing agents such as sodium hydrosulfite, mercurous chloride and sodium formaldehyde sulfoxylate (sodium hydroxyethylsulfinate). The combination of a perester free radical initiator and a promoter, which is a reducing agent, for conducting graft polymerization onto a polyolefin is effective in obtaining high conversion of monomer to polymer and high ratios of graft polymerized monomers to non-graft polymerized monomers. A further benefit is that a graft copolymer reaction product is obtained having minimum discoloration.

DETAILED DESCRIPTION OF THE INVENTION

The polyolefins employed as the backbone polymer in the graft polymerization of this invention include polymers containing a major proportion (i.e., at least 50% or more) of polyolefins derived from 1-alkenes having from two to eight carbon atoms and particularly from three to six carbon atoms. Such polyolefins, therefore, include polyethylene, polypropylene, propylene - ethylene terminal block copolymers, segmented ethylene-propylene block copolymers, ethylene-butene-1 block copolymers, polybutene-1, poly(4 - methylpentene-1), poly(3-methylbutene-1), and the like. The term "polyolefin" as used herein is intended to include copolymers of 1-alkene monomers having from two to eight carbon atoms with other copolymerizable monomers that comprise a minor proportion of the copolymer. Particularly useful polyolefin backbone polymers are those that are substantially crystalline polymers derived from 1-alkenes having from three to eight carbon atoms, i.e., polymers containing at least 25%, and preferably at least 50% crystallinity as determined by density-crystallinity relationships, a type of technique described by J. A. Gailey et al., SPE Technical Papers (ANTEC), vol. IX, Session IV–1, pages 1 to 4, February 1963. The polyolefin base polymer may be in any physical form convenient for the graft polymerization process such as a powder, filament, fabric, yarn, pellet, etc.

In the graft polymerization any ethylenically unsaturated monomer may be grafted onto the polyolefin substrate and preferably at least one of the monomers is a monoethylenically unsaturated, heterocyclic nitrogen-containing monomer. Representative heterocyclic nitrogen-containing monomers are vinyl pyridines, vinyl morpholinones and vinyl lactams such as vinyl pyrrolidones, N-vinyl succinimides and N-vinyl caprolactams. Examples of particular vinyl pyridines include 2-vinyl pyridine, 3-vinyl pyridine, 4-vinyl pyridine, 5-methyl-2-vinyl pyridine, 5-ethyl-2-vinyl pyridine, 2-methyl-5-vinyl pyridine, 2-ethyl-5-vinyl pyridine, 2-methyl-6-vinyl pyridine, 2-ethyl-6-vinyl pyridine, 2,3-dimethyl-5-vinyl pyridine, 2,6-diethyl-4-vinyl pyridine, 2-methyl-undecyl-3-vinyl pyridine, 2-isopropenyl pyridine, 5-propyl-2-vinyl pyridine and 2,4-dimethyl-6-vinyl pyridine. Vinyl morpholinones include N-vinyl-3-morpholinone, N-vinyl-5-methyl-3-morpholinone, N-vinyl-2-methyl-3-morpholinone, N-vinyl - 5 - phenyl-3-morpholinone and the like.

Useful vinyl lactams include N-vinylpyrrolidones such as N-vinyl-2-pyrrolidone itself, N-vinyl-5-methyl-2-pyrrolidone, N-vinyl-3,3-dimethyl-2-pyrrolidone, N-vinyl-4,4-dimethyl-2-pyrrolidone; N-vinylpiperidones such as N-vinyl-2-piperidone, N-vinyl-6-methyl-2-piperidone, N-vinyl-3,3-dimethyl piperidone and N-vinyl caprolactam. Other heterocyclic, nitrogen-containing monomers are N-vinyl piperidine, 2-vinyl piperidine, 4-vinyl piperidine, N-vinyl phthalimide and N-vinyl carbazole.

Ethylenically unsaturated monomers that may be graft polymerized onto the polyolefin substrate polymer either individually or in combination with an ethylenically unsaturated, heterocyclic nitrogen-containing monomer include styrenes, vinyl toluenes, monoethylenically unsaturated carboxylic acid esters, vinyl esters, monoethylenically unsaturated nitriles, vinyl halides, vinylidene halides, vinyl ethers, vinyl ketones, monoethylenically unsaturated amines and monoethylenically unsaturated carboxylic amides. Preferred monomers within the aforementioned classes of compounds are styrene, alpha-methyl styrene, vinyl-o,m or p-toluene, acrylonitrile, methacrylonitrile, vinyl chloride, vinylidene chloride, alkyl acrylic and methacrylic esters wherein the alkyl portion contains one to eight carbon atoms such as methyl acrylate, ethyl acrylate, butyl acrylate, methyl methacrylate, butyl methacrylate, dimethylaminoethyl methacrylate, t-butylaminoethyl methacrylate, vinyl acetate, vinyl propionate, vinyl ethyl ether, vinyl n-butyl ether, vinyl isobutyl ether, vinyl 2-chloroethyl ether, vinyl methyl ketone, vinyl ethyl ketone, vinyl butyl ketone, acrylamide and methacrylamide.

The free radical initiator for the graft polymerization may be perester or a diperester compound. Useful diperesters include the compounds described in U.S. Patent No. 3,264,274 such as 2,5-dimethyl-2,5-bis(perneopentanoyl)hexane and 2,5-dimethyl-2,5-bis(2-ethyl perhexanoyl)hexane. Useful monoperesters include t-butyl 2-ethyl perhexanoate, t-amyl 2-ethyl perhexanoate, t-butyl 3,5,5-trimethyl perhexanoate, t-amyl 3,5,5 - trimethyl perhexanoate, t-butyl 2-ethyl perbutyrate, t-amyl 2-ethyl perbutyrate, t-butyl perisobutyrate and t-amyl perisobutyrate. The amount of free radical initiator may vary from about 0.02% to about 5% or more, preferably 0.1% to about 3% by weight, based on the total weight of charged polymerizable monomers. Although amounts of free radical initiator in excess of 5% could be employed, such as procedure is not considered economical.

The promoter functions as a polymerization aid in that the total conversion of charged monomers to polymerized monomers is increased. Furthermore, it has been found that the promoters defined in this invention increase the ratio of graft polymerized monomers to non-graft polymerized monomers. An additional benefit obtained by employing certain of the promoters described in this invention is that color formation in the graft polymerized reaction product is substantially reduced. Another benefit of the promoters described in this invention is their ability to stabilize polymerizable heterocyclic nitrogen-containing monomers against further discoloration.

Preferred promoters are strong reducing agents that are also water-soluble or soluble in the reaction medium. Suitable promoters include both inorganic and organic reducing agents such as a lower valent salt of a multivalent metal, a hydrosulfite, a sulfite, a bisulfite, a hypophosphite and a thiosulfate. Representative lower valent salts of multivalent metals include cuprous chloride, chromous chloride, stannous chloride, mercurous chloride, ferrous sulfate and ferrous ammonium sulfate. Hydrosulfite promoters include zinc hydrosulfite and alkali metal hydrosulfites such as sodium hydrosulfite and potassium hydrosulfite. Typical sulfite promoters are alkali metal sulfites such as sodium sulfite and potassium sulfite. Other promoters include alkali metal bisulfites and alkali metal thiosulfates such as sodium bisulfite and sodium thiosulfate. Additional inorganic reducing agents include hypophosphorous acid and alkali metal hypophosphites such as sodium hypophosphites. Organic reducing agents include alkali metal formaldehyde sulfoxylates such as sodium formaldehyde sulfoxylate, hydrazine hydrate and hydrazine salts such as hydrazine hydrochloride and the like.

The promoter may be employed in an amount varying from about 0.1% to about 4% or more by weight, based on the total weight of the charged polymerizable monomers. The promoter may be introduced into the polymerization system by a variety of techniques, one of which is to charge the promoter to the reaction medium just prior to addition of the monomer(s) and free radical initiator(s). Alternatively, a promoter which is soluble in the charged monomers may be mixed with same and thereafter added to the reaction medium. The latter method of adding the promoter may provide the additional benefit of inhibiting color formation in the polymerizable ethylenically unsaturated heterocyclic nitrogen-containing monomers. Furthermore, it would not be necessary to remove the promoter by distillation, adsorption or other means from the polymerizable nitrogen-containing monomer prior to graft polymerization.

Graft polymerization may be accomplished in any desired manner by known grafting techniques. The monomer or monomers to be graft polymerized may be diluted in a solvent together with the polymerization initiator, then this mixture added to the reaction medium containing the polyolefin backbone polymer and promoter.

A preferred form of graft polymerization is an aqueous dispersion technique wherein a pulverulent polyolefin is dispersed in an aqueous solution containing a surface active agent and then the monomer or monomers to be graft polymerized together with the free radical initiator are introduced in any way desired to the reaction medium. The monomer, singly or in combination with one or more other ethylenically unsaturated polymerizable monomers as well as the graft polymerization catalyst, may be added to the reaction vessel by incremental addition from time to time or all at once as a single metered charge. The graft polymerization is generally conducted at a temperature in the range of about 30° to 120° C. or more, but generally in the range of about 70° to 100° C. If necessary, supraatmospheric pressures may be used to maintain the liquid phase. The time of polymerization is not critical and may vary from about 10 minutes to 4 or more hours.

If the graft polymerization is accomplished by an aqueous dispersion technique wherein the substrate polymer powder is dispersed in an aqueous medium, the dispersing agent or surfactant may be nonionic, anionic or cationic. Preferred surfactants are the nonionic alkylphenoxypolyalkoxyalkanols having alkyl groups from seven to eighteen carbon atoms and 6 to 60 or more alkoxy units such as heptylphenoxypolyethoxyethanols, octylphenoxypolyethoxyethanols and nonylphenoxypolyethoxyethanols.

Following the graft polymerization reaction, unreacted monomer may be removed from the reaction vessel by washing the product or by vacuum distillation. Thereafter, the grafted polyolefin may be removed from the reaction vessel, washed thoroughly and dried in a vacuum oven or similar device. The dyeable polyolefin compositions are now prepared for dye bath treatment and fabricating into the desired form.

To determine the conversion of charged monomers to graft polymer, a small sample is solvent extracted with a solvent for the non-grafted polymerized monomers but a non-solvent for the graft polymerized monomers such as ethanol, dimethylformamide, methyl ethyl ketone, or other polar organic solvents which selectively extract the non-grafted polymerized monomers. Thereafter, the product remaining after extraction is recovered, dried in an oven and appropriate analysis performed.

Filaments may be spun from the grafted polyolefin compositions by conventional spinning techniques. The grafted compositions can be melt spun or solution spun and the filaments then stretched to orient the molecules and develop the desired tensile strength to the products. After shaping the grafted compositions into filaments or other desired forms, dyeing with acid, premetallized or disperse dyes may be accomplished.

For purposes of illustrating the invention, the following examples are provided wherein, unless otherwise indicated, all parts and percentages are by weight:

Example 1

In a polymerization vessel equipped with a stirrer, thermometer, inlet and outlet tubes for inert gas, and a device for admitting reactants, a dispersion of 382 g. of a crystalline polypropylene powder having a flow rate of 4.9 (ASTM–D–1238–62T) in 1250 ml. of distilled water containing 1.60 g. of a surfactant comprising t-octylphenoxypolyethoxyethanol having an average of 10 ethoxy groups was introduced. After heating the mixture to 90°C., nitrogen was bubbled through to deaerate the system. Then 1% of sodium hydrosulfite, based on the total weight of charged monomers, was added and the pH was adjusted to 9 with a buffering agent. Thereafter, 105 g. of 4-vinyl pyridine and 13 g. of styrene were charged together with 0.5%, based on the weight of 4-vinyl pyridine and styrene monomers, of t-butyl 2-ethyl perhexanoate. Polymerization was conducted at 90° C. for one hour. At the end of this time, the essentially colorless polypropylene powder was removed by filtration, washed thoroughly with water and dried in a vacuum oven.

The total conversion of the 4-vinyl pyridine and styrene monomers to polymer was 95%. Non-grafted polymerized monomers were extracted with dimethylformamide and thereafter with methyl ethyl ketone in a Soxhlet apparatus. Analysis indicated that 77% of the charged monomers (81% of the polymerized monomers) were present in the reaction product as grafted polymer. Therefore, the ratio of graft polymerized monomers to non-graft polymerized monomers was 4.3 to 1.

An inhibitor system comprising 0.1% (based on the weight of polypropylene) of 2,6-ditertiarybutyl 4-methyl phenol, 0.5% dilauryl thiodipropionate and 0.15% calcium stearate was blended into the dry grafted polymer powder and the mixture was passed through an extruder and pelletized. After melt spinning into fibers, the grafted polypropylene was prepared for dye bath treatment.

Prior to dyeing, the fiber was prescoured in an aqueous solution of 1.0% (OWF) of t-octylphenoxypolyethoxyethanol having an average of 10 ethoxy units and 1.0% (OWF) soda ash for about 30 minutes at 82° C. The abbreviation "OWF" means on the weight of the fiber or article. Thereafter the fiber was dyed in an aqueous dye bath containing 2% (OWF) Capracyl Red G (Du Pont), a neutral pre-metallized dyestuff, and then washed for 15 minutes at 60° C. in an aqueous solution of 1.0% (OWF) t-octylphenoxypolyethoxyethanol having an average of 10 ethoxy units. The fibers were dyed to a deep red shade.

Evaluation of the dyed fiber showed excellent light fastness, wash resistance and dry cleaning resistance properties.

Example 2

The procedure of Example 1 was repeated using the same quantities and reactants. The total conversion of the 4-vinyl pyridine and styrene monomers to polymer was 92% of which 85% represented graft polymerized monomers. The ratio of graft polymerized monomers to non-graft polymerized monomers was 5.6 to 1.

Example 3

The same procedure and quantities of reactants employed in Example 1 were used in another run with the exception that the graft polymerization initiator was 0.5% of 2,5-dimethyl-2,5-bis(2-ethyl hexanoyl) hexane and the promoter was 1.0%, based on the total weight of the monomers, of ferrous ammonium sulfate. Polymerization was conducted for one hour at 90° C. and thereafter the reaction product was recovered by filtration. Analysis indicated that good conversion of monomers to total polymer and good conversion of monomers to graft copolymer were obtained. After incorporating the stabilizer system and dye according to Example 1, evaluation of the dyed product showed excellent light fastness, wash resistance and dry cleaning properties.

This example was repeated using 0.5% of 2,5-dimethyl-2,5-bis(perneopentanoyl)hexane and 1.0% of sodium hydrosulfite. Good conversions to total polymerized polymer as well as to graft copolymer were obtained.

Example 4

Example 1 was repeated except that the substrate olefin polymer was a propylene-ethylene terminal block copolymer having a flow rate of 4.0, the free radical initiator was 0.5% of t-butyl 2-ethyl perhexanoate and 1.0% of ferrous sulfate as the promoter. Similar good conversions to total polymer and to graft copolymer were obtained.

Example 5

The procedure of Example 1 was repeated except that 500 grams of 65 parts of a crystalline polypropylene powder having a flow rate of 10, 30 parts of 2-methyl 5-vinyl pyridine and 5 parts of styrene were employed using 0.4%, based on the weight of the pyridine and styrene monomers, of t-butyl perisobutyrate and 1.0%, based on the total weight of the monomers, of sodium hydrosulfite.

The reaction product was removed from the polymerization vessel, thoroughly washed with water and dried in a vacuum oven. Conversion totals of monomer to polymer and monomers to graft copolymer were similar to the values obtained in Example 1. Thereafter, the inhibitor system was blended into the grafted polypropylene powder and the mixture extruded and pelletized. A portion of the product was melt spun into fibers that were subsequently dyed with "Capracyl" Red G and evaluated for fiber properties. Excellent light fastness, wash resistance, dry cleaning properties and dye receptivity were obtained.

Example 6

The procedure of Example 1 was repeated except that 1.2% by weight, based on the total weight of charged monomers, of sodium formaldehyde sulfoxylate was employed as the promoter for the graft polymerization reaction. Evaluation data for total conversion of charged monomers to polymer and the ratio of graft polymerized monomers to non-graft polymerized monomers were similar to the values in Example 1.

Example 7

Following the procedure described in Example 1, 350 g. of the crystalline polypropylene of Example 1 were charged to a reaction vessel containing water and a surfactant to disperse the polypropylene. Sodium formaldehyde sulfoxylate, in an amount of 1%, based on the total weight of the monomers, was introduced into the reaction vessel. White stirring, a monomer charge of 75 g. of N-vinyl-2-pyrrolidone and 75 g. of methyl acrylate was added together with 1.5%, based on the total weight of the monomer, of t-butyl 3,5,5-trimethyl perhexanoate. Good conversions to graft copolymer were obtained.

Example 8

In the polymerization apparatus of Example 1 and using the same procedure, 350 g. of a propylene-ethylene terminal block copolymer having a flow rate of 5.5, 75 g. of 2-methyl-5-vinyl pyridine, 75 g. of 4-vinyl pyridine, and 0.5% of t-butyl 2-ethyl perhexanoate were charged to an aqueous solution containing a surfactant. Mercurous chloride in an amount of 1%, based on the total weight of the charged monomers, was employed as the promoter. Graft polymerization results similar to Example 1 were obtained.

For purposes of comparison and to show the selective effect of the promoter in combination with a perester free radical initiator to increase total conversion of monomer to polymer as well as enhanced graft polymerization, the following controls A through D illustrate graft copolymerization with conventional free radical initiators in combination with the promoter described in this invention.

Control A.—The graft polymerization procedure of Example 1 was repeated by charging 500 grams of 76.4 parts of a crystalline polypropylene powder having a flow rate of 4.9, 21.0 parts of 4-vinyl pyridine and 2.6 parts of styrene together with 0.5%, based on the total weight of 4-vinyl pyridine and styrene monomers, of benzoyl peroxide as the free radical initiator. After charging the polypropylene powder and before adding the monomers, the pH of the resultant solution was adjusted to 9 by the addition of a buffer solution and 1% of sodium hydrosulfite, based on the weight of 4-vinyl pyridine and styrene monomers, was added. Polymerization was conducted according to the procedure of Example 1. The reaction product was removed by filtration, washed thoroughly with water and dried in a vacuum oven.

The total conversion of 4-vinyl pyridine and styrene monomers to polymer was 40%. Non-grafted polymerized monomers were extracted with a solvent and thereafter analysis indicated that 18% of the charged monomers were present in the reaction product as grafted polymer. Therefore, the ratio of grafted polymerized monomers to non-grafted polymerized monomers was 0.8 to 1.

Control B.—Using the same procedure and same quantities of reactants, Control A was repeated with the exception that 1.0% of benzoyl peroxide, based on the weight of the 4-vinyl pyridine and styrene monomers, was employed as the free radical initiator. The identical amount of sodium hydrosulfite was charged to the reaction system as used in Control A.

The total conversion of the 4-vinyl pyridine and styrene monomers to polymer was 67%. After extraction of the non-grafted polymerized monomers, analysis showed that 28% of the charged monomers were present as grafted polymerized polymer. Therefore, 39% of the charged monomers were present in a non-grafted form and the ratio of grafted polymerized monomers to non-grafted polymerized monomers was 0.7 to 1.

Control C.— The procedure of Control A was repeated but 0.5%, based on the weight of the 4-vinyl pyridine and styrene monomers, of lauryl peroxide was employed as a free radical initiator. As in Control A, 1%, based on the total weight of charged monomers, of sodium hydrosulfite was added.

The total conversion of charged monomers to polymer was 81%. After extraction of the non-grafted polymerized monomers with ethanol in a Soxhlet apparatus, analysis indicated that 32% of the charged monomers were present as grafted copolymerized polymer. The ratio of grafted polymerized monomers to non-grafted polymerized monomers was 0.65 to 1.

Control D.—The procedure of Control C was repeated except that 1.0%, based on the total weight of charged monomers, of lauryl peroxide was employed as a free radical initiator. Again, 1%, based on the weight of the charged monomers, of sodium hydrosulfite was added to the polymerization medium.

Total conversion of 4-vinyl pyridine and styrene monomers to polymer was 67%. After extracting the non-grafted polymer, analysis indicated that 27% of the charged monomers were present as grafted copolymer. The ratio of grafted polymerized monomers to non-grafted polymerized monomers was 0.7 to 1.

Controls E and F describe graft polymerization with a perester free radical initator in the absence of a promoter.

Control E.—The graft polymerization technique of Example 1 was repeated using 68.5 parts of the same crystalline polypropylene of Example 1, 28.0 parts of 4-vinyl pyridine, 3.5 parts of styrene and 0.5%, based on the weight of 4-vinyl pyridine and styrene, of t-butyl 2-ethyl perhexanoate as the free radical initiator. Polymerization was conducted at a temperature of 90° C. for one hour. Total conversion of monomers to polymer was 87% and 65% of the charged monomers were graft polymerized. Thus, the ratio of graft polymerized monomers to non-graft polymerized monomers was 3.0 to 1.

Control F.—Following the procedure of Example 1, 500 g. of 76.4 parts of a crystalline polypropylene powder having a flow rate of 4.9 (ASTM–D–1238–62T), 21.0 parts of 4-vinyl pyridine and 2.6 parts of styrene were charged together with 0.25%, based on the weight of the 4-vinyl pyridine and styrene monomers, of 2,5-dimethyl-2,5-bis(2-ethyl perhexanoyl) hexane. Heating at 90° C. was continued for one hour and at the end of this time the grafted polypropylene powder was removed by filtration, washed thoroughly with water and dried in a vacuum oven.

The total conversion of the 4-vinyl pyridine and styrene monomers to polymer was 90%. Non-grafted polymerized monomers were extracted with dimethylformamide in a Soxhlet apparatus. Analysis indicated that 62% of the charged monomers (69% of the polymerized monomers) were present in the reaction product as graft polymers. The ratio of graft polymerized monomers to non-graft polymerized monomers was 2.2 to 1.

I claim:

1. In a process for the graft polymerization of at least one ethylenically unsaturated monomer onto a polyolefin derived from 1-alkenes having from 2 to 8 carbon atoms wherein the free radical initiator is a perester selected from the group consisting of t-butyl 2-ethylperhexanoate, t-amyl 2-ethylperhexanoate, t-butyl 3,5,5-trimethylperhexanoate, t-amyl 3,5,5-trimethylperhexanoate, t-butyl 2-ethylperbutyrate, t-amyl 2-ethylperbutyrate, t-butyl perisobutyrate, t-amyl perisobutyrate, 2,5-dimethyl-2,5-bis(perneopentanoyl) hexane and 2,5 - dimethyl-2,5-bis(2-ethylperhexanoyl) hexane, the improvement of conducting the graft polymerization reaction in the presence of said perester and a promoter selected from the group consisting of lower valent salts of multivalent metals, alkali metal hydrosulfites, alkali metal sulfites, alkali metal bisulfites, alkali metal thiosulfates and alkali metal formaldehyde sulfoxylates, amount of said perester being at least 0.02% by weight and the amount of said promoter being at least 0.1% by weight, based on the weight of said monomer.

2. A process according to claim 1 wherein at least one of said ethylenically unsaturated monomers is a monoethylenically unsaturated, heterocyclic nitrogen-containing monomer.

3. A process according to claim 1 wherein the graft polymerization reaction product is a fiber-forming, dye-receptive polyolefin.

4. A process according to claim 1 wherein said promoter is sodium hydrosulfite.

5. A graft polymerization process according to claim 1 wherein said polyolefin is a fiber-forming propylene polymer and at least one of said ethylenically unsaturated monomers is a monoethylenically unsaturated, heterocyclic nitrogen-containing monomer.

6. A graft polymerization process according to claim 5 wherein said heterocyclic nitrogen-containing monomer is selected from the group consisting of vinyl pyridines and vinyl lactams.

7. A graft polymerization process according to claim 1 wherein said polyolefin is a fiber-forming propylene polymer, at least one of said ethylenically unsaturated monomers is selected from the group consisting of vinyl pyridines and vinyl lactams, and said reducing agent is sodium hydrosulfite.

8. A graft polymerization process according to claim 1 wherein said perester free radical initiator is t-butyl 2-ethylperhexanoate and said promoter is an alkali metal hydrosulfite.

9. A graft polymerization process according to claim 1 wherein said polyolefin is polypropylene.

10. A graft polymerization process according to claim 8 wherein said alkali metal hydrosulfite is sodium hydrosulfite.

References Cited

UNITED STATES PATENTS

| | | | |
|---|---|---|---|
| 3,049,507 | 8/1962 | Stanton et al. | 260—45.5 |
| 3,049,508 | 8/1962 | Stanton et al. | 260—45.5 |
| 3,073,667 | 1/1963 | Bonvicini et al. | 8—115.5 |
| 3,264,274 | 8/1966 | Levestis | 260—80 |
| 3,316,199 | 4/1967 | Murphy | 260—29.6 |
| 3,322,661 | 5/1967 | Yoshikawa et al. | 204—159.17 |
| 3,322,712 | 5/1967 | Gardner et al. | 260—29.6 |

FOREIGN PATENTS

| | | | |
|---|---|---|---|
| 1,198,067 | 8/1965 | Germany | 260—80 |

JOSEPH L. SCHOFER, Primary Examiner

S. M. LEVIN, Assistant Examiner

U.S. Cl. X.R.

260—23 M, 45.85, 45.95, 878 B